United States Patent Office 3,362,964
Patented Jan. 9, 1968

3,362,964
17-OXYGENATED-16-OXAESTR-4-EN-3-ONES AND D-HOMO COMPOUNDS CORRESPONDING
John S. Baran, Morton Grove, Ill., assignor to G. D. Searle & Co., Chicago, Ill., a corporation of Delaware
No Drawing. Filed Nov. 4, 1964, Ser. No. 408,738
6 Claims. (Cl. 260—343.2)

The present invention relates to novel steroidal γ and δ lactones and to the lactols and lactol ethers derived therefrom. Those derivatives are more particularly described as 17-oxygenated-16- and 17 α-oxaestr-4-en-3-ones and are represented by the following structural formula

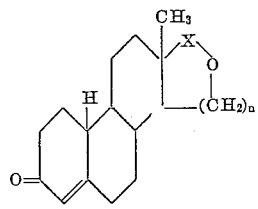

wherein X is a radical selected from the group consisting of carbonyl, hydroxymethylene, and (lower alkoxy)methylene, and $n$ is a positive integer less than 3.

The lower alkoxy radicals encompassed in the X term are typified by methoxy, ethoxy, propoxy, butoxy, pentyloxy, hexyloxy and the branched-chain groups isomeric therewith.

The compounds of this invention are useful in view of their valuable anti-biotic properties. They are, for example, anti-protozoal agents in consequence of their ability to inhibit the growth of such organisms as *Tetrahymena gelleii*. In addition, they are inhibitors of dicotyledenous seed germination.

The compounds of the present invention are conveniently produced by a process utilizing as starting materials the 17-enol esters of 3-(lower alkoxy)estra-1,3,5(10)-trien-17-ones. Thus, 17-acetoxyestra-1,3,5(10),16-tetraen-3-ol 3-methyl ether in methylene chloride is contacted with a stream of oxygen containing ozone to yield trans-2-carboxy - 1-formylmethyl - 2-methyl - 1,2,3,4,4a,9,10, 10a-octahydrophenanthren - 7-ol 7-methyl ether. Dehydration of that aldehydo-acid, typically by means of p-toluenesulfonic acid in benzene, results in 3-methoxy-17-oxa-D-homoestra-1,3,5,(10),15-tetraen-17α-one, which is submitted to an ozonolysis process analogous to that described above to produce trans-2-carboxy-1-formyl-2-methyl - 1,2,3,4,4a,9,10,10a-octahydrophenanthren - 7-ol 7-methyl ether. Reduction of these aldehydo-acid intermediates affords the corresponding hydroxy-acids, which are converted to the corresponding D-ring lactones. In the case of the D-homo lactones, lactonization occurs spontaneously during the reduction process. Thus, the aforementioned trans-2-carboxy - 1-formylmethyl - 2-methyl-1,2,3,4,4a,9,10,10a-octahydrophenanthren - 7-ol 7-methyl ether is allowed to reach with sodium borohydride in aqueous ethanol to afford trans-2-carboxy-1-(2-hydroxyethyl) - 2-methyl - 1,2,3,4,4a,9,10,10a-octahydrophenanthren-7-ol 7-methyl ether, which spontaneously cyclizes to afford 3-methoxy - 17-oxa-D-homoestra - 1,3,5(10)-trien-17α-one. When that reduction process is applied to trans - 2-carboxy-1-formyl-2-methyl - 1,2,3,4,4a,9,10,10a-octahydrophenanthren-7-ol 7-methyl ether, 2-carboxy-1-hydroxymethyl - 2-methyl-1,2,3,4,4a,9,10,10a-octahydrophenanthren-7-ol 7-methyl ether is obtained. Cyclization of the latter hydroxy-acid can be accomplished by heating with an acidic reagent in an inert organic solvent medium. When that reaction is conducted with p-toluenesulfonic acid in benzene, 3-methoxy-16-oxaestra - 1,3,5(10)-trien-17-one is obtained.

Reduction of the aforementioned lactones with a suitable reagent results in the corresponding lactols. In solution, the five-membered ring lactols exist as equilibrium mixtures of the tautomeric cyclic and open-chain forms, as is shown below:

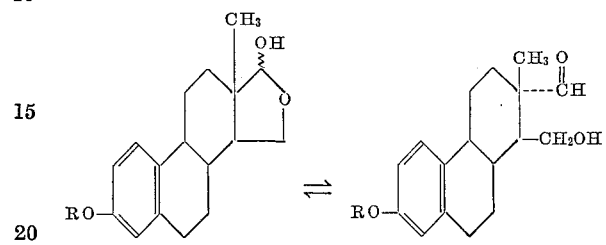

In that representation R is hydrogen or a lower alkyl or lower alkanoyl radical. Illustrative of that reduction procedure is the reaction of 3-methoxy - 16-oxaestra - 1,3, 5(10)-trien-17-one with diisobutyl aluminum hydride in toluene to afford 3-methoxy-16-oxaestra-1,3,5(10)-trien-17-ol, which is purified by chromatography to afford the pure 17α-epimer. Reaction of those lactols in an akylating medium affords the corresponding ethers. 3-methoxy-16 - oxaestra - 1,3,5(10) - trien - 17α-ol, for example, is contacted with methanol in the presence of p-toluenesulfonic acid to afford 16-oxaestra-1,3,5(10)-trien-3,17α-diol 3,17-dimethyl ether.

The aforementioned aldehydo-acids, hydroxy-acids and lactol ethers are converted to the corresponding instant compounds by reduction of the aromatic A-ring in an alkali metal-liquid ammonia medium followed by hydrolysis of the resulting 3-enol ether. 2-carboxy-1-formyl-2 - methyl-1,2,3,4,4a,9,10,10a - octahydrophenanthren-7-ol 7-methyl ether, for example, is contacted with lithium metal in liquid ammonia, and the resulting enol ether is hydrolyzed with aqueous methanolic hydrogen chloride to afford trans-2-carboxy-1-hydroxymethyl-2-methyl-1,2,-3,4,4a,4b,5,6,7,9,10,10a - dodecahydrophenanthren-7-one. Cyclization of that hydroxy-acid by heating in benzene containing p-toluenesulfonic acid affords the instant 16-oxaestr - 4 - ene - 3,17-dione. Similarly, 16-oxaestra-1,3,5-(10)-trien-3,17α-diol 3,17-dimethyl ether is contacted with lithium in liquid ammonia, and the resulting enol ether is cleaved by heating with aqueous methanolic hydrogen chloride to yield 17α-methoxy-16-oxaestr-4-en-3-one. In the case of the instant D-homo derivatives, the intermediate hydroxy-acids cyclize spontaneously to yield the corresponding δ lactones. Thus, reduction of trans-2-carboxy-1-formylmethyl-2-methyl-1,2,3,4,4a,9,10,10a - octahydrophenanthren-7-ol 7-methyl ether followed by hydrolysis of the resulting enol ether by the aforementioned processes affords directly 17 - oxa - D - homoestr-4-ene-3,17a-dione.

The instant lactols can be obtained alternatively by cleavage of the corresponding lactol ethers. As a specific example, 17α - methoxy - 16 - oxaestr-4-en-3-one is heated with hydrochloric acid in tetrahydrofuran to afford 17α-hydroxy-16-oxaestr-4-en-3-one.

In the case of the instant five-membered ring lactols and the corresponding ethers and esters, the 17α-oxygenated epimer predominates. The six-membered ring lactols and corresponding ethers and esters, on the other hand, are comprised of mixtures of the 17α- and 17β-epimers. These five-membered ring lactols, in solution, are in equilibrium with the tautomeric open-chain forms, as is shown below:

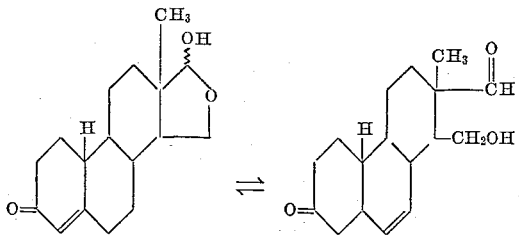

The following examples illustrate in further detail some of the compounds which constitute this invention together with methods for their preparation. The invention, however, is not to be construed as limited thereby either in spirit or in scope as many modifications both in materials and methods can be adapted without departing from the invention herein described. In these examples temperatures are indicated in degrees centigrade (° C.) and quantities of materials in parts by weight unless otherwise noted.

*Example 1*

Into a solution of 9.3 parts of 17-acetoxyestra-1,3,5-(10),16-tetraen-3-ol 3-methyl ether in 147 parts of methylene chloride, at about —70°, is passed a stream of oxygen containing 6% of ozone until one molecular equivalent of ozone is absorbed. To that reaction mixture is then added successively 2 parts of zinc and 42 parts of acetic acid, and the resulting mixture is stirred after the cooling bath is removed. An exothermic reaction ensues causing the temperature to rise to the reflux point, at which time heating is continued on the steam bath for about 15 minutes while the methylene chloride is removed by distillation. The residual mixture is diluted with about 300 parts of chloroform, then is filtered, and the filtrate is washed successively with water, dilute hydrochloric acid, and water. Distillation of the solvent at reduced pressure affords a residue which is dissolved in 30 parts of pyridine. To that pyridine solution is added a solution of 4 parts of potassium carbonate in 50 parts of water, and the resulting mixture is heated at about 90° for about 45 minutes, then is cooled to room temperature and poured carefully into a mixture of ice and excess dilute hydrochloric acid. The precipitate which forms is collected by filtration, washed on the filter with water, and dried in vacuo to afford trans-2-carboxy-1-formylmethyl - 2 - methyl-1,2,3,4,4a,9,10,10a-octahydrophenanthren-7-ol 7-methyl ether, melting at about 146–150°. Recrystallization of this crude product from a mixture of ether and hexane affords the pure material, characterized by a melting point of 160–161° and an optical rotation of +79° in chloroform. Infrared absorption maxima are observed at about 3.41, 3.67, 5.79, 5.88, 6.21, 7.79, and 9.62 microns.

A mixture of 1.2 parts of trans-2-carboxy-1-formylmethyl - 2 - methyl-1,2,3,4,4a,9,10,10a-octahydrophenanthren-7-ol 7-methyl ether and 1.2 parts of p-toluene-sulfonic acid monohydrate in 440 parts of benzene is distilled over a period of about 2 hours, during which time approximately 220 parts of benzene is collected. The reaction mixture is cooled to room temperature, then is washed with saturated aqueous sodium bicarbonate, dried over anhydrous magnesium sulfate, and concentrated to dryness at reduced pressure. The residue which remains is triturated with ether to afford 3-methoxy-17-oxa-D-homoestra - 1,3,5(10),15 - tetraen - 17a-one, which melts at about 139–154°. Decolorization by means of activated carbon and recrystallization from acetone results in the pure material, characterized by a melting point of about 160–163° and an optical rotation of —109° in chloroform. This compound displays infrared absorption peaks at about 3.38, 5.63, 6.02, 6.18, 8.58, 9.20, and 9.76 microns.

Into a solution of 6 parts of 3-methoxy-17-oxa-D-homoestra - 1,3,5(10),15-tetraen-17a-one in 94 parts of methylene chloride, at about —70°, is passed a stream of oxygen containing 6% of ozone. After approximately one molecular equivalent of ozone has been absorbed, the solution is flushed by means of a stream of nitrogen in order to remove excess oxidant and 6 parts of zinc followed by 21 parts of acetic acid is added. This mixture is stirred at room temperature for about 45 minutes, then is concentrated to a small volume by distillation, and is diluted with about 600 parts of chloroform. The resulting mixture is filtered, and the filtrate is washed successively with water, dilute hydrochloric acid and water. Distillation of this organic solution to dryness under reduced pressure affords a residue which is dissolved in 25 parts of pyridine. To that pyridine solution is added a solution of 6 parts of potassium carbonate in 100 parts of water, and that mixture is heated at about 90° for about 45 minutes, then is cooled to room temperature and poured gradually with stirring into a mixture of ice and excess dilute hydrochloric acid. The resulting precipitated solid is collected by filtration, washed with water on the filter and dried, resulting in trans-2-carboxy-1-formyl-2 - methyl - 1,2,3,4,4a,9,10,10a-octahydrophenanthren-7-ol 7-methyl ether, melting at about 174–176°. Two successive recrystallizations from ether-acetone produce a sample of the pure material, melting at about 195–197° and characterized further by infrared absorption peaks at about 3.39, 3.63, 5.79, 5.84, 6.21, 7.75, 8.89, and 9.62 microns.

*Example 2*

To a solution of one part of sodium borohydride in 50 parts of ethanol is added slowly with stirring 1.05 parts of trans - 2 - carboxy - 1-formyl-2-methyl-1,2,3,4,4a,9,10, 10a-octahydrophenanthren - 7 - ol 7-methyl ether, and the reaction mixture is diluted with water after the initial reaction subsides. The resulting solution is stirred at room temperature for about 45 minutes, then is made acidic by the addition of dilute hydrochloric acid, and is finally diluted with water to effect crystallization of the product. These crystals are collected by filtration, then washed on the filter with water, and dried to produce trans-2-carboxy-1-hydroxymethyl - 2 - methyl - 1,2,3,4,4a,9,10,10a-octahydrophenanthren-7-ol 7-methyl ether, which melts at about 154–159° with evolution of a gas. Further purification is effected by recrystallization from acetone-hexane, resulting in the pure material, melting at about 168–170° and accompanied by evolution of a gas. This substance is further characterized by an optical rotation of +63.5° in chloroform and also by infrared absorption maxima at about 3.0–4.0, 3.4, 5.96, 6.2, 8.59, and 9.3 microns.

*Example 3*

A mixture of one part of trans-2-carboxy-1-hydroxymethyl - 2 - methyl - 1,2,3,4,4a,9,10,10a - octahydrophenanthren-7-ol 7-methyl ether, 0.01 part of p-toluenesulfonic acid monohydrate, and 264 parts of benzene is distilled until approximately 88 parts of benzene is collected. The reaction mixture is cooled to room temperature and is washed with dilute aqueous sodium bicarbonate, then is dried over anhydrous magnesium sulfate and concentrated to dryness at reduced pressure to afford crystals of 3-methoxy-16-oxaestra-1,3,5(10)-trien-17-one, melting at about 168–170°. Crystallization of that material from acetone has no effect upon the melting point. This substance is characterized also by infrared absorption maxima at about 3.4, 5.62, 6.2, 9.26, and 10.12 microns.

To a solution of 2 parts of 3-methoxy-16-oxaestra-1, 3,5(10)-trien-17-one in 87 parts of dry toluene is added, at about —70°, 5.25 parts by volume of a 25% solution of diisobutyl aluminum hydride in toluene. This reaction mixture is stirred at that temperature for about one hour, then is poured carefully with stirring into a mixture of 100 parts of water and 200 parts of ice containing 42 parts of acetic acid. The organic layer is then separated, washed successively with water and saturated aqueous sodium bicarbonate, dried over anhydrous magnesium sulfate, and concentrated to dryness at reduced pressure. The resulting crystalline residue is dissolved in benzene, and that solution is chromatographed on a silica gel column. Elution of the column with 10% ethyl acetate in benzene affords 3 - methoxy-16-oxaestra-1,3,5(10) - trien-17α-ol, melting at about 137–139°. It is characterized further by infrared absorption maxima at about 2.96, 3.04, 3.40, 6.22, 7.59, 9.13, and 11.29 microns (potassium bromide disc).

To a solution of 1.9 parts of 3-methoxy-16-oxaestra-1,3,5(10)-trien-17α-ol in 40 parts of methanol is added 0.05 part of p-toluenesulfonic acid monohydrate, and the precipitate which forms is collected by filtration and dried. Recrystallization of this crude product from methylene chloride-methanol results in 16-oxaestra-1,3,5(10)-trien-3,17α-diol 3,17-dimethyl ether, melting at about 109–110°. It exhibits infrared absorption maxima at about 3.41, 6.22, 8.08, 9.12, 9.67, 10.02, 10.25, and 10.66 microns (potassium bromide disc), and an optical rotation of —38° in chloroform.

Example 4

The reaction of 3-methoxy-16-oxaestra-1,3,5(10)-trien-17α-ol with an equivalent quantity of ethanol according to the procedure described in Example 3 results in 3-methoxy - 16 - oxaestra-1,3,5(10)-trien-17α-ol 17-ethyl ether.

Example 5

To a stirred mixture of 490 parts of liquid ammonia, 560 parts of isopropyl alcohol and 3 parts of lithium wire is added rapidly a solution of 7.5 parts of trans-2-carboxy - 1 - formyl - 2 - methyl-1,2,3,4,4a,9,10,10a-octahydrophenanthren-7-ol 7-methyl ether in 45 parts of tetrahydrofuran containing 160 parts of isopropyl alcohol. The mixture is then stirred for about 35 minutes, during which time an additional 12 parts of lithium wire is added. The volatile materials are then removed by distillation under a stream of nitrogen, and the resulting solid residue is dissolved in saturated aqueous ammonium chloride. That aqueous solution is made acidic with dilute hydrochloric acid, then is extracted with chloroform. The chloroform extract is washed with water, dried over anhydrous magnesium sulfate and concentrated to dryness under reduced pressure. The resulting residue is dissolved in aqueous methanolic hydrogen chloride, and that solution is heated on a steam bath for about 20 minutes, then stripped of methanol under reduced pressure. The resulting residue is partitioned between ethyl acetate and aqueous sodium bicarbonate, and the organic layer is separated, dried over anhydrous magnesium sulfate, and concentrated to dryness under reduced pressure. The residual oil consists of a mixture of 16-oxaestr-4-ene-3,17-dione and trans-2-carboxy-1-hydroxymethyl - 2 - methyl-1,2,3,4,4a,4b,5,6,7,9,10,10a-dodecahydrophenanthren-7-one. That mixture is dissolved in 220 parts of benzene containing a small quantity of methylene chloride, and one part of p-toluene-sulfonic acid monohydrate is added to the solution. The resulting reaction mixture is distilled slowly over a period of about 30 minutes, then is cooled and washed with dilute aqueous sodium bicarbonate. Drying of that solution over anhydrous magnesium sulfate followed by removal of the solvent by distillation under reduced pressure affords an oily residue, which is triturated with a mixture of methanol and hexane to afford crystalline 16-oxaestr-4-ene-3,17-dione, melting at about 173–184°. Further purification is effected by recrystallization of the latter material from methanol-acetone to afford a pure sample, melting at about 207–210°. This substance is characterized by the following structural formula

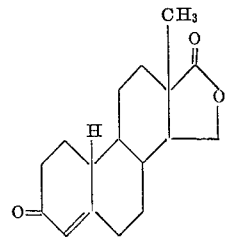

Example 6

To a mixture of 3 parts of lithium wire with 525 parts of liquid ammonia and 600 parts of isopropyl alcohol is added a solution of 5 parts of trans-2-carboxy-1-hydroxymethyl - 2 - methyl-1,2,3,4,4a,9,10,10a-octahydrophenanthren-7-ol 7-methyl ether in 400 parts of isopropyl alcohol. Additional lithium wire is added portionwise over a period of about 20 minutes in order to maintain a slight excess. The mixture is then concentrated to dryness by heating in a nitrogen atmosphere. The residue is dissolved in cold water, and that aqueous solution is washed with hexane, then acidified by the addition of excess hydrochloric acid. The acidic mixture is extracted with chloroform, and the organic layer is separated, washed with water, dried over anhydrous magnesium sulfate and evaporated to dryness to afford an oily residue. The aqueous layer is concentrated to a small volume, and the precipitate which appears is collected by filtration and dried to yield the crude product, melting at about 175–200°.

The oily residue obtained from the chloroform layer is dissolved in aqueous methanolic hydrogen chloride, and the mixture is distilled slowly to remove methanol. The residual aqueous mixture is "seeded" with the aforementioned crude product, and the crystalline precipitate which forms is collected by filtration and dried. The two batches of crystalline crude product are combined and recrystallized from methylene chloride-methanol containing activated carbon to afford 16-oxaestr-4-ene-3,17-dione, identical with the product of Example 1.

Example 7

To a mixture of one part of lithium wire, 175 parts of liquid ammonia, and 80 parts of isopropyl alcohol is added, over a short period of time, a solution of 9.8 parts of trans-2-carboxy - 1 - formylmethyl-2-methyl-1,2,3,4,4a,9,10,10a-octahydrophenanthren-7-ol 7-methyl ether in 60 parts of isopropyl alcohol containing 22.5 parts of tetrahydrofuran. An additional 4 parts of lithium wire is added to the reaction mixture over a period of 10–12 minutes, after which time the volatile materials are removed under a stream of nitrogen with vigorous stirring and heating. When there is only a small amount of solvent remaining, the residual mixture is dissolved in water, and the resulting aqueous solution is washed with ether, then acidified to pH 1–2 with 4 N hydrochloric acid, partially concentrated under reduced pressure, and extracted with chloroform. The chloroform layer is separated, washed with water, dried over anhydrous magnesium sulfate, and stripped of solvent under reduced pressure to afford the crude product. Recrystallization of that crude material from ether-hexane affords 17-oxa-D-homoestr-4-ene-3,17a-dione, melting at about 180–184°. Further recrystallization from hexane-acetone results in the pure material, melting at about 192–194°. This compound is characterized further by an optical rotation, in chloroform, of +71.5° and also by an ultraviolet absorption maximum at about 238.5 millimicrons with a molecular extinction coefficient of about 17,050. This compound can be represented by the following structural formula

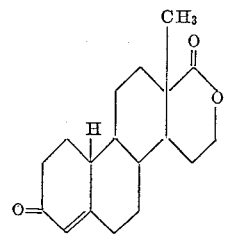

*Example 8*

A solution of 3 parts of 16-oxaestra-1,3,5(10)-trien-3,17α-diol 3,17-dimethyl ether in 72 parts of tetrahydrofuran containing 4 parts of tertiary-butyl alcohol is added to 140 parts of liquid ammonia with stirring. To that mixture is then added, over a period of about 45 minutes, sufficient lithium wire to maintain a slight excess. Approximately 8 parts of methanol is then added to destroy the excess reagent, and the resulting colorless mixture is concentrated to dryness under reduced pressure, then diluted with approximately 200 parts of water. The crystalline solid which separates is collected by filtration, washed on the filter with water, and dried under reduced pressure to afford 16-oxaestra-2,5(10)-diene-3,17α-diol 3,17-dimethyl ether, melting at about 120–125°. This compound exhibits infrared absorption maxima at about 5.87 and 5.99 microns.

A solution of 3 parts of 16-oxaestra-1,3,5(10)-trien-3,17α-diol 3,17-dimethyl ether in 600 parts of methanol containing 500 parts by volume of 4 N hydrochloric acid is heated at 90–100°, under nitrogen, over a period of about 45 minutes, allowing the methanol to slowly distill. The residual aqueous solution is cooled, neutralized with aqueous sodium bicarbonate, then extracted with chloroform. The chloroform extract is separated, dried over anhydrous magnesium sulfate, and stripped of solvent by distillation under reduced pressure. The resulting oily residue crystallizes upon cooling and is triturated with ether-hexane to afford 17α-methoxy-16-oxaestr-4-en-3-one, melting at about 142–149°. Recrystallization of that material from ether-hexane affords a pure sample, melting at about 159–161°. This compound possesses a optical rotation of −54° in chloroform and displays an ultraviolet absorption maximum at about 239 millmicrons with a molecular extinction coefficient of about 16,700. It is characterized further by the following structural formula

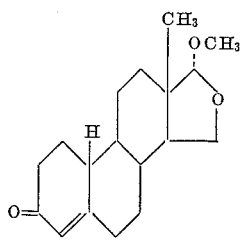

*Example 9*

A solution of 2.5 parts of 17α-methoxy-16-oxaestr-4-en-3-one in 135 parts of tetrahydrofuran containing 50 parts by volume of 0.5 N hydrochloric acid is distilled slowly over a period of about 45 minutes, then is cooled to room temperature, neutralized by the addition of excess aqueous sodium bicarbonate, and extracted with chloroform. The chloroform layer is separated, dried over anhydrous magnesium sulfate, and distilled to dryness to afford the crude product as an oil. That oily material is dissolved in benzene and chromatographed on a silica gel column. Elution of the column with 30% ethyl acetate in benzene affords pure 17α-hydroxy-16-oxaestr-4-en-3-one, melting at about 128–130°. This compound can be represented by the following structural formula

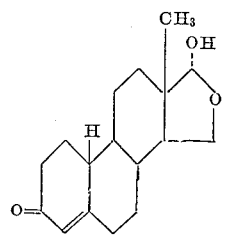

*Example 10*

By reducing an equivalent quantity of 3-methoxy-16-oxaestra-1,3,5(10)-trien-17α-ol 17-ethyl ether according to the procedure of Example 8 and substituting, in the hydrolysis step, an equivalent quantity of ethanol for methanol, there is obtained 17α-ethoxy-16-oxaestr-4-en-3-one, characterized by the following structural formula

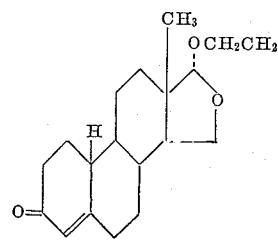

*Example 11*

The reduction of 2.1 parts of 3-methoxy-17-oxa-D-homoestra-1,3,5(10)-trien-17a-one with diisobutyl aluminum hydride by the procedure described in Example 3 results in 3-methoxy-17-oxa-D-homoestra-1,3,5(10)-trien-17a-ol, melting at about 132–133°. Purification by recrystallization from ether-hexane results in the pure material, melting at about 144–146°. Infrared absorption maxima are observed, in a potassium bromide disc, at about 6.21, 7.58, 8.08, 8.60, 9.20, and 9.57 microns.

*Example 12*

By substituting an equivalent quantity of 3-methoxy-17-oxa-D-homoestra-1,3,5(10)-trien-17a-ol and otherwise proceeding according to the processes described in Example 3, there is obtained 17-oxa-D-homoestra-1,3,5(10)-trien-3,17a-diol 3,17a-dimethyl ether, melting at about 103–110°.

*Example 13*

The substitution of an equivalent quantity of 17-oxa-D-homoestra-1,3,5(10)-trien-17a-ol 3,17a-dimethyl ether in the processes described in Example 8 affords 17a-methoxy-17-oxa-D-homoestr-4-en-3-one of the following structural formula

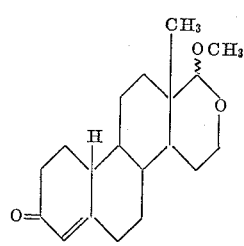

*Example 14*

By substituting an equivalent quantity of 17a-methoxy-17-oxa-D-homoestr-4-en-3-one and otherwise proceeding according to the processes described in Example 9, there is obtained 17a-hydroxy-17-oxa-D-homoestr-4-en-3-one of the structural formula

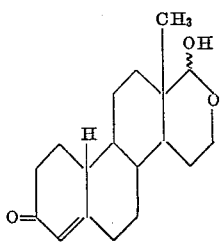

What is claimed is:
1. A compound of the formula

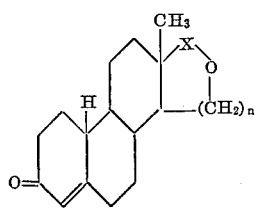

wherein $n$ is a positive integer less than 3, and X is a radical selected from the group consisting of carbonyl, hydroxymethylene, and (lower alkoxy)methylene.

2. 16-oxaestr-4-ene-3,17-dione.
3. 17-oxa-D-homoestra-3,17a-dione.
4. 17α-hydroxy-16-oxaestr-4-en-3-one.
5. A compound of the formula

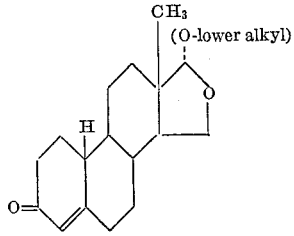

6. 17α-methoxy-16-oxaestr-4-en-3-one.

References Cited
UNITED STATES PATENTS
2,499,247  2/1950  Jacobsen et al. _____ 260—343.2

JAMES A. PATTEN, *Primary Examiner.*

UNITED STATES PATENT OFFICE
CERTIFICATE OF CORRECTION

Patent No. 3,362,964　　　　　　　　　　　　　January 9, 1968

John S. Baran

It is hereby certified that error appears in the above numbered patent requiring correction and that the said Letters Patent should read as corrected below.

Column 7, line 31, for "-1,3,5(10)-trien-" read -- -2,5(10)-diene- --.

Signed and sealed this 22nd day of April 1969.

(SEAL)
Attest:

Edward M. Fletcher, Jr.　　　　　　　　　　　EDWARD J. BRENNER
Attesting Officer　　　　　　　　　　　　　　Commissioner of Patents